(12) United States Patent
Oh

(10) Patent No.: US 6,410,631 B1
(45) Date of Patent: Jun. 25, 2002

(54) COMPOSITION FOR PRODUCTION OF SILICA GLASS USING SOL-GEL PROCESS

(75) Inventor: Jeong-Hyun Oh, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/492,536

(22) Filed: Jan. 27, 2000

(30) Foreign Application Priority Data

Jan. 29, 1999 (KR) .............................................. 99-2900

(51) Int. Cl.⁷ ............................ C08K 7/14; C08L 57/12
(52) U.S. Cl. .......................... 524/386; 65/17.2; 501/12; 264/621; 264/670; 524/492; 524/493; 524/494; 524/829
(58) Field of Search ........................... 65/17.2; 264/621, 264/670; 501/12; 524/492, 493, 494, 829 386

(56) References Cited

U.S. PATENT DOCUMENTS

| | | | |
|---|---|---|---|
| 4,282,171 A | * | 8/1981 | Hoke |
| 4,419,115 A | | 12/1983 | Johnson, Jr. et al. |
| 4,605,428 A | | 8/1986 | Johnson, Jr. et al. |
| 4,624,800 A | | 11/1986 | Sasaki et al. |
| 4,680,045 A | | 7/1987 | Osafune et al. |
| 4,681,615 A | | 7/1987 | Toki et al. |
| 4,786,302 A | | 11/1988 | Osafune et al. |
| 4,894,194 A | | 1/1990 | Janney |
| 4,945,074 A | | 7/1990 | Blout |
| 5,145,908 A | * | 9/1992 | Janney ........................ 524/827 |
| 5,240,488 A | | 8/1993 | Chandross et al. |
| 5,250,096 A | | 10/1993 | Bruce et al. |
| 5,254,508 A | | 10/1993 | Kirbir et al. |
| 5,856,379 A | | 1/1999 | Shiratsuchi et al. |
| 5,919,280 A | * | 7/1999 | Oh .............................. 65/17.2 |
| 6,066,279 A | * | 5/2000 | Walls et al. ................. 264/670 |
| 6,228,299 B1 | * | 5/2001 | Janney ........................ 264/670 |

FOREIGN PATENT DOCUMENTS

| | | |
|---|---|---|
| EP | 0 532 113 A1 | 3/1993 |
| FR | 2 681 534 A1 | 3/1993 |
| GB | 2 113 200 A | 8/1983 |
| JP | 62-265130 A | 11/1987 |
| JP | 63-85018 A | 4/1988 |
| JP | 1-176234 A | 7/1989 |
| JP | 1-176235 A | 7/1989 |

* cited by examiner

*Primary Examiner*—James Derrington
(74) *Attorney, Agent, or Firm*—Robert E. Bushnell, Esq.

(57) ABSTRACT

A composition for production of silica glass using a sol-gel process is described, comprising silica particles, a dispersing agent, and a solution containing a polymerizable monomer for formation of acrylic resin and a crosslink agent dissolved in distilled water. The polymerizable monomer is n-methylol acrylamide or n-methylol methacrylamide. A method for production of silica glass is described, including the step of adding silica particles and a dispersing agent to a premix solution of the polymerizable monomer for formation of acrylic resin and the crosslink agent dissolved in distilled water.

23 Claims, No Drawings

COMPOSITION FOR PRODUCTION OF SILICA GLASS USING SOL-GEL PROCESS

CLAIM OF PRIORITY

This application makes reference to, incorporates the same herein, and claims all benefits accruing under 35 U.S.C. §119 from my application COMPOSITION FOR PRODUCTION OF SILICA GLASS USING SOL-GEL PROCESS filed with the Korean Industrial Property Office on Jan. 29, 1999 and there duly assigned Serial No. 2900/1999.

BACKGROUND OF THE INVENTION

1. Field of the Invention

The present invention relates to a composition for production of silica glass using a sol-gel process, and more particularly to a composition for production of silica glass using a sol-gel process, which exhibits an improved processability allowing fabrication of products having a firm structure while allowing a process thereof using a lathe.

2. Description of the Related Art

Generally, silica glass is transparent and chemically inactive and exhibits superior characteristics in terms of thermal stability and strength while having a relatively low thermal expansion coefficient. By virtue of these characteristics, silica glass is used for optical devices such as optical fibers or optical lenses.

An optical fiber basically has an inner core and an outer cladding having a refractive index different from that of the core to allow total reflection of light in the core. In order to fabricate such an optical fiber, an optical fiber preform is fabricated which has a core rod and an overcladding tube surrounding the core rod. The optical fiber preform is subjected to a thermal treatment, and is then drawn into an optical fiber.

The fabrication of such an optical fiber preform may be achieved using a modified chemical vapor deposition (MCVD) method, a vapor phase axial deposition (VAD) method, or an outside vapor deposition (OVD) method.

In accordance with the MCVD method, an optical fiber preform is fabricated from a high-purity silica glass overcladding tube. This silica glass overcladding tube is fabricated using a sol-gel process.

The sol-gel process is a liquid-phase process capable of exhibiting a high productivity and achieving a free adjustment for the composition of products. This sol-gel process is also highly economical because it is generally carried out at a low temperature. Since a high-purity material is used as the starting material for the sol-gel process, this sol-gel process is very useful for the fabrication of photo masks for semiconductors or the fabrication of high-purity silica glass.

Now, a method for fabricating an overcladding tube made of silica glass using such a sol-gel process will be described in brief.

First, silica particles are dispersed in water, thereby forming a sol. The formed sol is kept, as it is, for a desired period of time, thereby aging the sol. The aged sol is then placed into a mold to induce a gelation thereof. After completion of the gelation, the resultant gel is separated from the mold, and then dried.

The dried gel is subjected to a primary thermal treatment in order to remove organic substances from the gel. A silica glass overcladding tube is fabricated using the resultant gel while carrying out a reaction for removal of hydroxy groups and a sintering reaction.

The reactivity of the above mentioned sol-gel process depends on factors such as the gelation reaction, the composition, pressure and pH of the sol used, and the solvent used. However, it is difficult to control this reactivity within a desired range in accordance with appropriate adjustments of the above mentioned factors. The formed gel may be highly vulnerable to cracking during the drying thereof. During the sintering process, the gel may also be subjected to a shrinkage and cracking. In order to solve such problems, various methods have been proposed which include a method using a drying control chemical additive (DCCA), a re-dispersion method, a supercritical drying method, and a method using a polymeric binder.

In accordance with the method using a DCCA, the solvent in the gel exhibits a low local volatilization rate difference. Accordingly, a minimized local stress difference in the gel is exhibited during drying the gel. As a result, the gel has an increased hardness, so that it exhibits a reduced formation of cracks.

In accordance with the re-dispersion method, fine dried silica powder, namely, fumed silica, is dispersed in water, thereby forming a sol which is, in turn, subjected to a gelation process. During the gelation process, the sol is formed into an agglomerate due to hydrogen bonding of silica particles. The formed agglomerate is dried, thermally treated, and ground, so that it becomes powder. The resultant powder is re-dispersed in water. The resultant product obtained after the re-dispersion is gelled in a mold, and then sintered to form a product having a desired shape.

However, all the above mentioned methods are not sufficiently effective in suppressing the generation of cracks occurring during drying the gel. Furthermore, they have a problem in that complex processes are used. In order to solve such problems, a method has been proposed which uses, as a binding agent, an acrylic resin produced by a polymerization of a monomer, such as acrylamide or methacrylamide, with a crosslinking agent. In accordance with this method, the cracking phenomenon occurring during a drying process is reduced. However, this method has a problem in that methacrylamide or acrylamide, which is used as a monomer, is undesirable in terms of environmental protection.

SUMMARY OF THE INVENTION

It is therefore an object of the present invention to provide an improved composition and process for production of silica glass.

A further object of the present invention is to efficiently suppress crack formation during gel drying in a sol-gel process.

A yet further object o[0086] the invention is to provide a composition for production of silica glass which does not contain methacrylamide, acrylamide or other environmentally undesirable monomers.

A still further object of the invention is to provide a gel which has improved shaping processibility.

A still yet further object of the invention is to provide a gel which can be shaped using a lathe.

In accordance with the present invention, these objects are accomplished by providing a composition for production of silica glass using a sol-gel process comprising: silica particles; a dispersing agent; a polymerizable monomer for formation of acrylic resin and a crosslink agent dissolved in distilled water, the polymerizable monomer being n-methylolacrylamide or n-methylolmethacrylamide; and a solvent.

In the method of the present invention, a premix solution is prepared containing a polymerizable monomer and a cross-linking agent in a solvent. The polymerizable monomer of the present invention is n-methylolacrylamide or n-methylolmethacrylamide. Silica particles and a dispersant are added to the premix solution and dispersed to form a sol. A plasticizer may also be added. The mixing ratio between silica particles and the premix solution is preferably in the range of 4:6 to 6:4 by weight.

A polymerization initiation agent is added, and a catalyst or a gelling agent may be added. The sol is placed in a mold for gelling. The resulting gel is removed from the mold, aged, dried and treated to provide a silica glass tube. The resulting gel may also be shaped using a lathe.

DETAILED DESCRIPTION OF THE PREFERRED EMBODIMENT

In accordance with the present invention, a macromolecule, which is produced to have a three-dimensional network structure by polymerizing a premix solution containing a polymerizable monomer for formation of acrylic resin and a crosslink agent dissolved in distilled water, is used as a binding agent to produce silica glass using a sol-gel process. For the polymerizable monomer, n-methylolacrylamide ($CH_2=CHCONHCH_2OH$) or n-methylolmethacrylamide ($CH_2=C(CH_3)CONHCH_2OH$) is used in accordance with the present invention. Such a macromolecular binding agent is uniformly distributed in the entire portion of a gel. Accordingly, it is possible to reduce or prevent problems involved in a general sol-gel process, that is, a density gradient, while suppressing the generation of cracks in a sol during drying the sol, and achieving a reduction in drying time.

Preferably, the polymerizable monomer is used in a content of 2 to 20 weight % based on the weight of the premix solution. Where the content of the polymerizable monomer is less than 4 weight % based on the weight of the premix solution, it is preferred that a gelling agent be added to the premix solution to adjust the pH of the premix solution to be 9 to 11, thereby promoting the gelation of a sol formed. On the other hand, where the content of the polymerizable monomer is not less than 4 weight % based on the weight of the premix solution, it is possible to produce silica glass having desired physical properties without any additional pH adjustment.

For the crosslink agent,. any crosslink agents typically used in the production of silica glass are usable. Preferably, N,N'-methylenebisacrylamide is used as the crosslink agent. Preferably, the crosslink agent is used in a content of 0.05 to 1.0 weight % based on the weight of the premix solution.

It is also preferred that the concentration of the solid part in the premix solution including the polymerizable monomer and the crosslink agent be ranged from 2 weight % to 21 weight % based on the weight of the premix solution in order to avoid a residue of carbon after an organic decomposition involved in the sol-gel process. Where the concentration of the solid part in the premix solution is within the above mentioned range, a moist gel produced from the premix solution exhibits softness. In this case, the gelation is efficiently carried out, thereby achieving an improvement in the strength of the moist gel.

Now, a method for producing silica glass from the above mentioned composition using a sol-gel process in accordance with the present invention will be described in detail.

In accordance with the method of the present invention, a premix solution is first prepared by dissolving a polymerizable monomer and a crosslink agent. Silica particles are dispersed in the prepared premix solution along with a dispersing agent, thereby forming a sol. The dispersing agent serves to allow the silica particles to be uniformly dispersed in the premix solution. Preferably, the dispersing agent includes tetramethyl ammonium hydroxide or the like.

If necessary, an additive such as a plasticizer may be added to the sol. For the plasticizer, polyhydric alcohol is preferably used. The polyhydric alcohol may include glycerin, ethylene glycol, or 2-methylpropyne-1,2,3-triol.

Preferably, the mixing weight ratio between the silica particles and the premix solution is within a range of 4:6 to 6:4. Where the premix solution is used in an amount beyond the above mentioned range, there are problems in that a gel formed from the sol may be highly vulnerable to cracking during the drying thereof or that it is difficult for silica particles to be dispersed in the premix solution. After the formation of the sol, bubbles existing in the sol are removed using a vacuum pump. Thereafter, the resultant sol is aged for a desired period of time to stabilize the silica particles therein.

A polymerization initiating agent is then added to the resultant sol. The resultant product is placed into a mold so that it is gelled in the mold. For the polymerization initiating agent, 2 imidazoline-2-yl is preferable. Of course, the polymerization initiating agent is not limited to this material. When a polymerization initiating agent is added to the sol, a gelling agent or a catalyst may be added to the sol, if necessary. For instance, where the content of the polymerizable monomer is less than 4 weight %, a gelling agent is used to adjust the pH of the sol to 9 to 11, thereby promoting the gelation of the sol. In this case, the gelling agent is added in an amount typically used in the fabrication of silica glass. For the catalyst, N,N,N',N'-tetramethylenediamine (TEMED) is preferably used.

The resultant gel is aged at room temperature. The aged moist gel is removed from the mold, and then dried in a constant temperature and humidity device maintained at a temperature of 20 to 50° C. and a relative humidity of 70 to 95%.

The dried gel is then treated to form a silica tube. The following conditions are exemplary. The dried gel is heated to a temperature of 300 to 700° C. at a rate of approximately 50° C. per hour in the atmosphere, and then maintained at the temperature for 2 to 8 hours. Thereafter, the gel is heated again to a temperature of 800 to 1,200° C. at a rate of approximately 100° C. per hour in a chlorine gas atmosphere, and then maintained at the temperature for 1 to 8 hours. Subsequently, the gel is heated again to a temperature of 1,100 to 1,500° C. at a rate of approximately 100° C. per hour in a helium gas atmosphere, and then maintained at the temperature for 1 to 8 hours. Thus, a silica glass tube is fabricated.

Hereinafter, the present invention will be described in conjunction with various examples.

These examples are made only for illustrative purposes, and the present invention is not to be construed as being limited to those examples.

EXAMPLE 1

A premix solution was prepared by dissolving 14.0 weight % n-methylolacrylamide and 0.6 weight % N,N'-methylenebisacrylamide in 85.4 weight % deionized water. 500 g of fumed silica (Aerosil OX-50, Degussa Company)

was mixed with 500 ml of the premix solution along with 52 ml of a solution containing 25.0 weight % tetramethylammonium hydroxide (TMAH), using a high shear mixer, thereby dispersing it in the premix solution. As a result, a sol was formed. Bubbles existing in the sol were then removed using a vacuum pump. The resultant sol was aged for 15 hours. 2 mL of 2-imidazoline-2-yl as a polymerization initiating agent and 2 m[008c] of N,N,N',N'-tetramethylenediamine (TEMED) as a catalyst were added to the aged sol, and then mixed together.

The resultant mixture was poured in a mold, and then gelled in the mold. After 30 minutes elapsed, a moist gel formed by the gelation was removed from the mold. The moist gel was then dried for 4 days in a constant temperature and humidity device maintained at a temperature of 30° C. and a relative humidity of 90%. The resultant gel was heated to a temperature of 100° C. at a rate of 10° C. per hour, and then maintained at that temperature for 10 hours, thereby removing residual moisture from the gel. As a result, a dried gel was obtained.

Thereafter, the dried gel was heated again to a temperature of 600° C. at a rate of 50° C. per hour, and then maintained at the temperature for 5 hours, thereby removing organic substances from the dried gel. Subsequently, the gel freed of organic substances was heated again to a temperature of 1,000° C. at a rate of 100° C. per hour, and then maintained at that temperature for 5 hours to carry out a glassification thereof. The glassification was conducted in a chlorine gas atmosphere to remove hydroxy groups from the gel.

Finally, the resultant gel was heated again to a temperature of 1,400° C. at a rate of 100° C. per hour in a helium gas atmosphere, and then sintered at that temperature for 4 hours. Thus, a silica glass tube was fabricated.

EXAMPLE 2

A premix solution was prepared by dissolving 12.0 weight % n-methylolacrylamide and 0.5 weight % N,N'-methylenebisacrylamide in 87.5 weight % deionized water. 2,000 g of fumed silica (Aerosil OX-50, Degussa Company) was mixed with 2,000 ml of the premix solution along with 222 ml of a solution containing 25.0 weight % TMAH, using a high shear mixer, thereby dispersing it in the premix solution. As a result, a sol was formed. Bubbles existing in the sol were then removed using a vacuum pump. The resultant sol was aged for 15 hours. 6 mL of 2-imidazoline-2-yl as a polymerization initiating agent and 6mL of N,N,N',N'-tetramethylenediamine (TEMED) as a catalyst were added to the aged sol, and then mixed together.

The resultant mixture was poured in a mold, and then gelled in the mold. After 60 minutes elapsed, a moist gel formed in accordance with the gelation was removed from the mold. The moist gel was then dried for 6 days in a constant temperature and humidity device maintained at a temperature of 25° C. and a relative humidity of 75%. The resultant gel was heated to a temperature of 120° C. at a rate of 10° C. per hour, and then maintained at that temperature for 5 hours, thereby removing residual moisture from the gel. As a result, a dried gel was obtained.

Thereafter, the dried gel was heated again to a temperature of 550° C. at a rate of 50° C. per hour, and then maintained at the temperature for 5 hours, thereby removing organic substances from the dried gel. Subsequently, the gel free of organic substances was heated again to a temperature of 1,000° C. at a rate of 100° C. per hour, and then maintained at that temperature for 5 hours to carry out a glassification thereof. The glassification was conducted in a chlorine gas atmosphere to remove hydroxy groups from the gel.

Finally, the resultant gel was heated again to a temperature of 1,400° C. at a rate of 100° C. per hour in a helium gas atmosphere, and then sintered at that temperature for 4 hours. Thus, a silica glass tube was fabricated.

EXAMPLE 3

A premix solution was prepared by dissolving 4.8 weight % n-methylolacrylamide and 0.2 weight % N,N'-methylenebisacrylamide in 95 weight % deionized water.

100 g of fumed silica (Aerosil OX-50, Degussa Company) was mixed with 1,000 mL of the premix solution along with 116 mL of a solution containing 25.0 weight % TMAH, using a high shear mixer, thereby dispersing it in the premix solution. As a result, a sol was formed. Bubbles existing in the sol were then removed using a vacuum pump. The resultant sol was aged for 15 hours. 3 mL of 2-imidazoline-2-yl as a polymerization initiating agent and 3 mL of N,N,N',N'-tetramethylenediamine (TEMED) as a catalyst were added to the aged sol, and then mixed together.

The resultant mixture was poured in a mold, and then gelled in the mold. After 60 minutes elapsed, a moist gel formed in accordance with the gelation was removed from the mold. The moist gel was then dried for 6 days in a constant temperature and humidity device maintained at a temperature of 25° C. and a relative humidity of 75%. The resultant gel was heated to a temperature of 120° C. at a rate of 20° C. per hour, and then maintained at that temperature for 5 hours, thereby removing residual moisture from the gel. As a result, a dried gel was obtained.

Thereafter, the dried gel was heated again to a temperature of 550° C. at a rate of 50° C. per hour, and then maintained at the temperature for 5 hours, thereby removing organic substances from the dried gel. Subsequently, the gel free of organic substances was heated again to a temperature of 1,000° C. at a rate of 100° C. per hour, and then maintained at that temperature for 5 hours to carry out a glassification thereof. The glassification was conducted in a chlorine gas atmosphere to remove hydroxy groups from the gel.

Finally, the resultant gel was heated again to a temperature of 1,450° C. at a rate of 100° C. per hour in a helium gas atmosphere, and then sintered at that temperature for 4 hours. Thus, a silica glass tube was fabricated.

EXAMPLE 4

A premix solution was prepared by dissolving 3.0 weight % n-methylolacrylamide and 0.2 weight % N,N'-methylenebisacrylamide in 96.8 weight % deionized water.

500 g of fumed silica (Aerosil OX-50, Degussa Company) was mixed with 500 mL of the premix solution along with 52 mL of a solution containing 25.0 weight % TMAH, using a high shear mixer, thereby dispersing it in the premix solution. As a result, a sol was formed. Bubbles existing in the sol were then removed using a vacuum pump. The resultant sol was aged for 10 hours. 6 mL of 2-imidazoline-2-yl as a polymerization initiating agent, 2 mL of N,N,N',N'-tetramethylenediamine (TEMED) as a catalyst, and 8 g (1.6 weight % based on the weight of silica) of methyl formate as a gelling agent were added to the aged sol, and then mixed together.

The resultant mixture was poured in a mold, and then gelled in the mold. After 60 minutes elapsed, a moist gel formed in accordance with the gelation was removed from the mold. The moist gel was then dried for 6 days in a constant temperature and humidity device maintained at a temperature of 25° C. and a relative humidity of 75%. The resultant gel was heated to a temperature of 120° C. at a rate of 20° C. per hour, and then maintained at that temperature for 5 hours, thereby removing residual moisture from the gel. As a result, a dried gel was obtained.

Thereafter, the dried gel was heated again to a temperature of 550° C. at a rate of 50° C. per hour, and then maintained at the temperature for 5 hours, thereby removing organic materials from the dried gel. Subsequently, the gel free of organic materials was heated again to a temperature of 1,000° C. at a rate of 100° C. per hour, and then maintained at that temperature for 5 hours to carry out a glassification thereof. The glassification was conducted in a chlorine gas atmosphere to remove hydroxy groups from the gel.

Finally, the resultant gel was heated again to a temperature of 1,400° C. at a rate of 100° C. per hour in a helium gas atmosphere, and then sintered at that temperature for 4 hours. Thus, a silica glass tube was fabricated.

EXAMPLE 5

A silica glass tube was fabricated using the same method as that in Example 4, except that methyl lactate was used instead of methyl formate.

EXAMPLE 6

A silica glass tube was fabricated using the same method as that in Example 4, except that ethyl lactate was used instead of methyl formate.

EXAMPLE 7 to 12

In Examples 7 to 12, silica glass tubes were fabricated using respective methods identical to those in Examples 1 to 6, except that n-methylolmethacrylamide was used instead of n-methylolacrylamide.

COMPARATIVE EXAMPLE 1 to 6

In Comparative Examples 1 to 6, silica glass tubes were fabricated using respective methods identical to those in Examples 1 to 6, except that acrylamide was used instead of n-methylolacrylamide.

COMPARATIVE EXAMPLES 7 to 12

In Comparative Examples 7 to 12, silica glass tubes were fabricated using the same method as that in Example 1, respectively, except that methacrylamide was used instead of n-methylolacrylamide.

For the silica glass tubes respectively fabricated in accordance with Examples 1 to 12 and Comparative Examples 1 to 12, measurements were conducted in terms of physical properties or phenomenons exhibited after the gel drying process, that is, cracking, shrinkage, and shaping processability. After the measurements, it was found that the silica glass tubes of Examples 1 to 12 exhibited a reduced formation of cracks and a reduced shrinkage involved in the gel drying process, as compared to those of Comparative Examples 1 to 12. The silica glass tubes of Examples 1 to 12 also exhibited an improvement in shaping processability. Thus, silica glass tubes having a firm structure can be fabricated in accordance with the present invention.

As apparent from the above description, the present invention provides a composition for production of silica glass using a sol-gel process, which is capable of efficiently suppressing the generation of cracks in a gel during drying the gel while minimizing the density gradient of the gel. The composition of the present invention provides an improvement in shaping processability, thereby allowing a more free shaping of the gel. This also makes it possible to allow the gel to be shaped using a lathe. N-methylol acrylamide and n-methylol methacrylamide, each of which is a polymerizable monomer, for formation of a binding agent, included in the composition of the present invention, are substances preferred in terms of environmental protection and an improved processability.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A composition for production of silica glass using a sol-gel process, comprising:

a premix solution comprising a solvent, a monomer selected from the group consisting essentially of n-methylolacrylamide and n-methylolmethacrylamide, and a cross-linking agent;

a dispersing agent; and silica particles, wherein the weight content of said cross-linking agent relative to the weight of said premix solution is in the range of approximately 0.05 to 1% by weight and the ratio of the weight of said silica particles to the weight of said premix solution is in the range of approximately 6:4 to 4:6.

2. The composition of claim 1, said solvent being water.

3. The composition of claim 1, the weight content of said monomer relative to the weight of said monomer, said cross-linking agent and said solvent being in the range of approximately 2 to 20%.

4. The composition of claim 1, the weight content of said monomer plus cross-linking agent relative to the weight of said monomer, cross-linking agent and solvent, being in the range of approximately 2 to 21%.

5. The composition of claim 1, said cross-linking agent being N,N'-methylenebisacrylamide.

6. The composition of claim 1, further comprising:

an initiation agent for polymerization of the monomer.

7. The composition of claim 6, further comprising:

a catalyst for polymerization of the monomer.

8. The composition of claim 6, said initiation agent being 2-imidazole-2-yl.

9. The composition of claim 6, said catalyst being N,N, N',N'-tetramethylenediamine.

10. The composition of claim 1, further comprising:

a gelling agent.

11. The composition of claim 3, further comprising:

a gelling agent; and said weight content of said monomer being less than approximately 4% by weight based on total weight of said premix solution.

12. The composition of claim 10, said gelling agent being ethyl lactate or methyl formate.

13. The composition of claim 1, further comprising:

a plasticizer.

14. The composition of claim 13, said plasticizer being a polyhydric alcohol.

15. The composition of claim 1, said dispersing agent being tetramethylammonium hydroxide.

16. A method of preparing a composition for production of silica glass, comprising the steps of:
   preparing a premix solution consisting essentially of a monomer in an amount between approximately 2–20% by weight based on total weight of the premix solution, a cross-linking agent in an amount between approximately 0.05 to 1% by weight based on total weight of the premix solution, and water, said monomer selected from the group consisting essentially of n-methylolacrylamide and n-methylolmethacrylamide; and
   adding silica particles and a dispersant to the premix solution to form a sol, a ratio of a weight of said silica to the weight of said premix solution being in the range of 4:6 to 6:4.

17. The method of claim 16, further comprised of the premix solution having a weight content of the cross-linking agent plus the monomer in the range of approximately 2 to 21%.

18. The method of claim 16, further comprising the step of adding a polymerization initiation agent.

19. The method of claim 18, said polymerization initiation agent being 2-imidazole-2-yl.

20. The method of claim 16, further comprising the step of adding a catalyst.

21. The method of claim 20, said catalyst being N,N,N', N'-tetramethylenediamine.

22. The method of claim 16, further comprising the step of adding a plasticizer.

23. The method of claim 22, said plasticizer being a polyhydric alcohol.

* * * * *